United States Patent
Treptow et al.

(10) Patent No.: US 10,222,139 B2
(45) Date of Patent: Mar. 5, 2019

(54) RETAINING ELEMENT AND SPACER PLANE OF A TUBE BUNDLE

(75) Inventors: Hans-Dieter Treptow, Bochum (DE);
Holger Friebel, Oberhausen (DE);
Michael Arlt, Recklinghausen (DE)

(73) Assignee: Babcock Borsig Service GmbH, Oberhausen (DE)

( * ) Notice: Subject to any disclaimer, the term of this patent is extended or adjusted under 35 U.S.C. 154(b) by 274 days.

(21) Appl. No.: 13/635,047

(22) PCT Filed: Mar. 15, 2011

(86) PCT No.: PCT/EP2011/053839
§ 371 (c)(1),
(2), (4) Date: Nov. 30, 2012

(87) PCT Pub. No.: WO2011/113808
PCT Pub. Date: Sep. 22, 2011

(65) Prior Publication Data
US 2013/0062036 A1    Mar. 14, 2013

(30) Foreign Application Priority Data
Mar. 16, 2010    (DE) .......................... 10 2010 011 644

(51) Int. Cl.
*F28F 9/013*    (2006.01)
*F16L 3/237*    (2006.01)
*F28D 7/06*    (2006.01)

(52) U.S. Cl.
CPC .............. *F28F 9/013* (2013.01); *F16L 3/237* (2013.01); *F28D 7/06* (2013.01)

(58) Field of Classification Search
CPC .. F28F 9/0132; F28F 9/013; F28F 9/22; F28F 9/0131; F22B 37/205
USPC .............................. 165/157, 162, 67; 248/58
See application file for complete search history.

(56) References Cited

U.S. PATENT DOCUMENTS

| | | | |
|---|---|---|---|
| 1,852,363 A | | 4/1932 | Parent |
| 2,646,818 A | * | 7/1953 | Bimpson .................. F16L 3/00 122/510 |
| 3,173,987 A | * | 3/1965 | Potruch ......................... 174/545 |
| 3,269,366 A | * | 8/1966 | Petit et al. ..................... 122/392 |
| 3,277,959 A | * | 10/1966 | Withers .................. B29C 65/02 165/159 |

(Continued)

FOREIGN PATENT DOCUMENTS

| | | | |
|---|---|---|---|
| DE | 4217923 A1 | | 12/1993 |
| DE | 102008005170 | * | 7/2009 |

(Continued)

OTHER PUBLICATIONS

Kumpf, DE102008021021TRANS (English Translation), Oct. 2009.*

(Continued)

*Primary Examiner* — Eric Ruppert
(74) *Attorney, Agent, or Firm* — The Webb Law Firm

(57) ABSTRACT

A retention element for a spacer plane of a pipe bundle is illustrated and described. In order to be able to provide large coherent free faces of the spacer plane with simplified assembly of the spacer plane, it is proposed that two guide elements each for receiving a pipe of the pipe bundle and a spacing element which is arranged between the guide elements be provided and that an opening for the passage of a rod-like support be provided between the guide elements.

22 Claims, 5 Drawing Sheets

(56) References Cited

U.S. PATENT DOCUMENTS

| | | | |
|---|---|---|---|
| 3,439,737 A * | 4/1969 | Betts et al. ................ 165/109.1 |
| 3,896,874 A * | 7/1975 | Bongaards et al. ............ 165/82 |
| 4,100,889 A | 7/1978 | Chayes |
| 4,944,254 A | 7/1990 | Fournier et al. |
| 5,730,399 A * | 3/1998 | Baginski ........................ 248/58 |
| 2008/0217489 A1* | 9/2008 | Richard Higbee ... F28F 9/0132 248/68.1 |
| 2010/0276131 A1* | 11/2010 | Barwig ............... F02B 29/0462 165/162 |

FOREIGN PATENT DOCUMENTS

| | | | |
|---|---|---|---|
| DE | 102008021021 | * | 10/2009 |
| DE | 102008021021 A1 | | 10/2009 |
| EP | 0364920 A1 | | 4/1990 |
| EP | 1231422 A1 | | 8/2002 |
| JP | 2006125689 | * | 6/2006 |
| WO | 02053962 A1 | | 7/2002 |
| WO | WO2009033643 | * | 3/2009 |
| WO | 2009130146 A1 | | 10/2009 |

OTHER PUBLICATIONS

Pashmann, DE102008005170TRANS (English Translation), Jul. 2009.*
Barwig, WO2009033643TRANS (English Translation), Mar. 2009.*
Tokawa, JP2006125689TRANS (English Translation), Jun. 2006.*
Muepro GmbH, Muepro Doppelschelle, IKZ Haustechnik Sanitar, Heizung Klima Elektro, Stobel Verlag, Arnsberg, DE, Jan. 1, 1979, XP-002086692, vol. 34, No. 3.

* cited by examiner

RETAINING ELEMENT AND SPACER PLANE OF A TUBE BUNDLE

BACKGROUND OF THE INVENTION

Field of the Invention

The invention relates to a retention element for a spacer plane of a pipe bundle. The invention further relates to a spacer plane of a pipe bundle of a heat exchanger.

Description of the Related Art

There are known various constructions of heat exchangers which have pipe bundles and which are used for various applications. The heat exchangers may be used, for example, for cooling or heating exhaust gases of a power station. In this case, the heat exchange is carried out between a liquid in the pipes and a gas between the pipes. However, heat exchangers with pipe bundles for heat exchange between two gases or two liquids are also known. In particular, pipe bundles for heating or cooling exhaust gases are subjected to flow perpendicularly relative to the pipes.

The pipes may be produced substantially in accordance with the corrosive properties of the media involved comprising metals or plastics materials and may optionally further be coated. Plastics pipes are often constructed in a flexible manner. The pipe bundles may further be composed of straight pipes or U-shaped pipes, the pipes extending substantially parallel with each other over large extents of the pipe bundle.

So that the mutual spacing of the pipes, that is to say, the so-called pitch of the pipe bundle, is permanently ensured and excessive oscillations of the pipes can be prevented, so-called spacer planes are provided in the pipe bundle. In these planes, which typically extend perpendicularly relative to the pipes, each pipe of the pipe bundle is retained in a predetermined position by means of corresponding retention elements.

DE 42 17 923 A1 discloses a retention element and a spacer plane which have a frame which extends around the pipe bundle. In this frame, a series of rods are braced parallel with each other. There are fitted onto each rod a plurality of sleeves which are connected to each other and to adjacent sleeves to form a retention element. A pipe of the pipe bundle is clamped and consequently positioned between each of the sleeves. Owing to the identical nature of the sleeves and the rods, a modular retention element of the spacer plane is produced. However, the disadvantage of the known retention element and the known spacer plane is the complex production thereof. Furthermore, the free cross-section surface-area of the spacer plane is composed of a plurality of small, non-coherent free faces.

SUMMARY OF THE INVENTION

An object of the invention is therefore to configure and develop the spacer plane and the retention element of the known type which is described in greater detail in the introduction in such a manner that large coherent free faces of the spacer plane can be provided, with the assembly of the spacer plane being simplified.

This object is achieved with a retention element in that there are provided two guide elements each for receiving a pipe of the pipe bundle and a spacing element which is arranged between the guide elements, and in that an opening for the passage of a rod-like support is provided between the guide elements.

This object is further achieved by a spacer plane according to the preamble of claim 8 in that each retention element has two guide elements and a spacing element which is provided between the guide elements, and in that a pipe is retained in each guide element at mutually opposing sides of the support.

The retention elements according to the invention enable a modular construction of a spacer plane by means of identical retention elements. To this end, in a spacer plane there is associated with two pipe rows a rod-like support, onto which a plurality of retention elements are fitted, respectively. The number of retention elements preferably corresponds to the number of pipes of a pipe row. A pipe is in each case guided by the two guide elements of each retention element and thereby positioned in the spacer plane. The two pipes retained by a retention element are part of adjacent pipe rows which are arranged at opposing sides of the rod-like support. For the sake of simplicity, the supports and the pipe rows of a spacer plane preferably extend substantially parallel to each other.

The spacing of two pipe rows which are retained by means of a support is determined by means of the spacing elements which are arranged between the guide elements. In contrast, the spacing of two pairs of pipe rows which are associated with adjacent supports can be selected independently of the retention element used. It is thus readily possible to provide different gap widths between adjacent pipe rows of a pipe bundle.

The mutual spacing of the pipes of a pipe row is further produced in accordance with the spacings of the retention elements which are arranged along the support. In order to fix the retention elements along the support, the retention elements may be fitted onto the corresponding support in a positive-locking, frictionally engaging and/or non-positive-locking manner. In spite of the use of identical retention elements, a high level of flexibility in the configuration of a spacer plane is thus ensured. That is to say, different spacer planes can still be constructed, even using identically prefabricated retention elements.

Since the retention elements are constructed in a structurally simple manner and may have small dimensions, the retention elements are very simple, quick and cost-effective to produce. Furthermore, however, the retention elements also enable very simple, rapid and cost-effective assembly of a spacer plane in the manner described above.

The retention elements can readily be prefabricated with various standardised dimensions. In order to construct a specific spacer plane, retention elements with a standard size can then be selected. Since, owing to the selection of the retention elements, only individual dimensions of the spacer plane can be determined, many different spacer planes can be constructed with a small number of different, standardised retention elements.

The spacer planes constructed using the retention elements described further have large coherent free faces. Large coherent free faces reduce the danger of particles being deposited on the spacer planes and gradually blocking or clogging individual portions of the pipe bundle. In particular the condition that a support must be provided only in every other gap between the pipe rows of a pipe bundle and adjacent pairs of pipe bundles do not have to be connected to each other by means of additional retention elements has a positive effect on the size of the coherent free faces.

Owing to the described structure of the spacer planes using the retention elements which have also been described, particle-like deposits can further readily be cleaned away, both from the spacer plane and from the pipes between two spacer planes.

Furthermore, the spacer plane may be arranged in a fixed manner or so as to be able to be displaced along the pipe bundle. A fixed arrangement of the spacer plane is advantageous when the pipes are guided in the guide elements in a displaceable manner. A displaceable arrangement may, however, be advantageous when the thermal expansion of the pipes to be anticipated is significant but the pipes are securely retained in the guide elements. The spacer plane is then retained itself by the pipe bundle and, depending on the longitudinal expansions of the pipes, displaced longitudinally with respect to the pipe bundle in order to prevent damage to the pipes owing to longitudinal expansion.

In a first embodiment of the retention element, the opening for the passage of a rod-like support is provided in the spacing element. This enables structurally simple construction of the retention elements. Regardless of this, it is expedient for the opening for the passage of the rod-like support to be provided substantially centrally between the two guide elements of the retention element in order to prevent any tilting moments.

Alternatively or in addition, there may be provision for the guide elements to be constructed in a sleeve-like manner. The guide elements are then preferably constructed so as to be substantially longer than the diameter of the guide elements. In this manner, the pipes are retained and guided in the guide elements over a relatively great length so that the danger of damage to the pipes and/or the retention elements owing to abrasion locations between the pipes and the guide elements is reduced. In order to keep the contact faces between pipes and guide elements small, they may in principle have angular cross-sections, the number of corners being determined in particular by the production complexity.

In order to construct the contact faces between the pipes and the guide elements so as to be as large as possible so that non-uniform wear of the pipes is prevented, the guide elements may be constructed in a tubular manner. In this context, circular cross-sections of the guide elements which preferably substantially correspond to the outer diameter of the guided pipes are particularly favourable. The cross-section diameter of the guide elements is greater than the outer diameter of the pipes when they are intended only to be guided into the guide elements but not to be retained.

The production of the retention elements and/or the spacer planes can be simplified when the retention elements are constructed in an integral manner.

In order to keep the production costs of the retention elements low and to improve the corrosion resistance of the retention elements, there is provision in another embodiment for the retention element to be formed from plastics material. It is particularly preferable in this regard, not only with respect to the material costs, for the retention elements to be injection moulded or extruded.

In order to ensure that the pipes of a pipe row are arranged uniformly and with a predetermined spacing from each other, the retention element may be provided with a spacer. The spacer may be constructed in such a manner that two subsequent retention elements which are fitted onto the support are in mutual abutment when the corresponding pipes assume the predetermined spacing with respect to each other. From a structural viewpoint, it may be preferable for the spacer to be fitted to the spacing element. A spacer may also be provided at each side of the spacing element.

So that successive retention elements are spaced neither too close to nor too far from each other, it is advantageous for the spacer to have a securing portion. The securing portion then preferably serves to secure identical retention elements to each other longitudinally relative to the rod-like support.

A retention element may serve to assemble another component of the pipe bundle if a recess in the form of a receiving member is provided at one end of the retention element. A sound-proofing plate may be inserted if necessary into such a recess. The recess may be constructed, for example, substantially in the form of a groove in the spacing element. This recess may alternatively also be formed, on the one hand, by the spacing element and, on the other hand, by the guide elements. In the case of a groove-like recess, the spacing element may then form the groove base, whilst the guide elements form the groove sides of the receiving member.

In a first embodiment of the spacer plane, two adjacent pipe rows of the pipe bundle are retained by a support. A support is then preferably provided in each alternate intermediate space between the pipe rows of the pipe bundle. In this regard, the support extends in the direction of the pipe rows. In this manner, the number of supports required is reduced and the coherent free face is enlarged.

In order to be able to clean away deposits of solid material, there are introduced into the pipe bundle so-called spray hoses, from which a cleaning fluid can then be dispensed into the intermediate space between the pipes of the pipe bundle. This is structurally possible in a particularly simple manner if at least individual spacing elements of the retention elements of a spacer plane each have an opening for the passage of a spray hose. Corresponding retention elements then retain both mutually adjacent pipes and a spray hose.

In order to prevent adjacent pipes of a pipe row from assuming an excessively small spacing from each other, there may be provision for two adjacent retention elements to be spaced apart from each other by means of a spacer. This spacer may be a separate component which is fitted if necessary between two retention elements on the rod-like support. In order to simplify the assembly of a spacer plane and in order to reduce the components required for this, however, it may be advantageous for each retention element to have at least one spacer. The retention element is then preferably constructed in one piece with the spacer. Depending on the type of production of the retention elements, however, it may be expedient for the retention elements to be constructed integrally with the spacer.

The spacer may in particular contribute to the stabilisation of the entire spacer plane if the spacer is constructed in a sleeve-like manner and is arranged around the opening for the passage of the support. In this instance, the support is guided through the spacer so that it can be supported on the support, if necessary. It is particularly preferable in this context for the spacer to be constructed concentrically relative to the opening for the passage of the support. This contributes not only to a more simple and cost-effective production of the retention elements, but also better support of the spacers on the support.

Alternatively or additionally, the stability of the spacer plane and the assembly can be improved by a plurality of retention elements being connected to each other in the longitudinal direction of the support to form a retention device. This can also have a positive effect on the precise positioning of the pipes of a pair of pipe rows which are retained by means of a support. In this instance, a plurality of retention elements form a retention device for positioning a plurality of pipes, which extends in the direction of the support and is retained thereby.

The mutual connection of the retention elements is preferably carried out in a positive-locking, non-positive-locking and/or frictionally engaging manner. In this manner, a spacer plane can be produced in a rapid and cost-effective manner in spite of the retention elements being connected to each other.

If the retention elements are connected to each other, it is advantageous for a spacer of a retention element to be connected to a spacing element of the adjacent retention element. Alternatively, a spacer may also be connected to a spacer of the adjacent retention element. To this end, it is advantageous for each retention element to have a spacer at both sides of the spacing element. In both cases, owing to the mutual connection of the retention elements, a predetermined mutual spacing of the pipes of a pipe row is ensured at the same time.

In the spacer plane, if necessary, there may exclusively be provided retention elements having a recess in the form of a receiving member, even when only the recesses of specific retention elements are used as a receiving member, for instance, for a sound-proofing plate. However, it may also be sufficient for only the retention members carried by specific rod-like supports to be provided with a corresponding recess. Sound-proofing plates are preferably provided only between specific pipe rows of the pipe bundle. Sound-proofing plates must also not only extend over the entire length of the pipe rows so that, in the case of terminal retention elements which do not co-operate with a sound-proofing plate, a recess can be dispensed with. The retention elements which have a recess are preferably arranged, if necessary in groups, parallel with adjacent pipe rows one behind the other.

In order to provide the required space for the recess, the opening for the passage of a support may be arranged in an eccentric manner. The opening for the passage of a support is then preferably displaced towards the end of the spacing element facing away from the recess.

In another preferred embodiment, retention elements of a spacer plane have recesses at the upper ends thereof, whilst retention elements of the spacer plane which is located above have recesses at the lower ends thereof. In such a case, sound-proofing plates may readily be assembled with the lower and the upper edge thereof in retention elements of two adjacent spacer planes. The retention elements which co-operate with a sound-proofing plate are preferably associated with the same pipe rows of the pipe bundle.

BRIEF DESCRIPTION OF THE DRAWINGS

The invention is explained in greater detail below with reference to drawings which simply illustrate exemplary embodiments and in which.

DETAILED DESCRIPTION OF THE INVENTION

Figure 1:
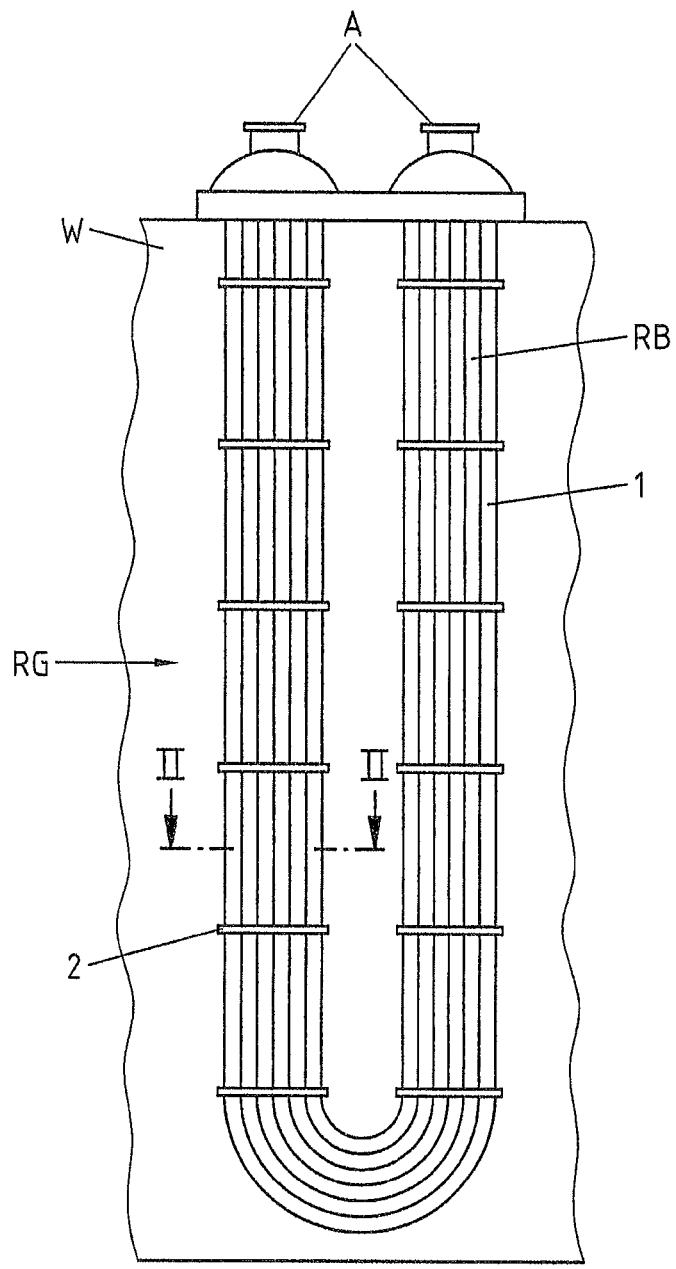
FIG. 1 is a schematic illustration of a heat exchanger having a pipe bundle.

FIG. 1 illustrates a heat exchanger W for heating or cooling exhaust gases RG. The heat exchanger W has a pipe bundle RB comprising a plurality of separate pipes 1. The pipes 1 are constructed in a U-shaped manner and suspended from above in the heat-exchanger W so that the heat carrier fluid flowing through the pipes 1 is supplied and discharged again by means of connections A at the upper side of the heat exchanger W.

The pipes 1 of the pipe bundle RB are orientated parallel with each other over large extents thereof. The flow direction of the exhaust gas RG is perpendicular relative to the longitudinal extent of the pipe bundle RB. The pipes 1 of the pipe bundle RB are positioned relative to each other by means of a plurality of spacer planes 2.

Figure 2:
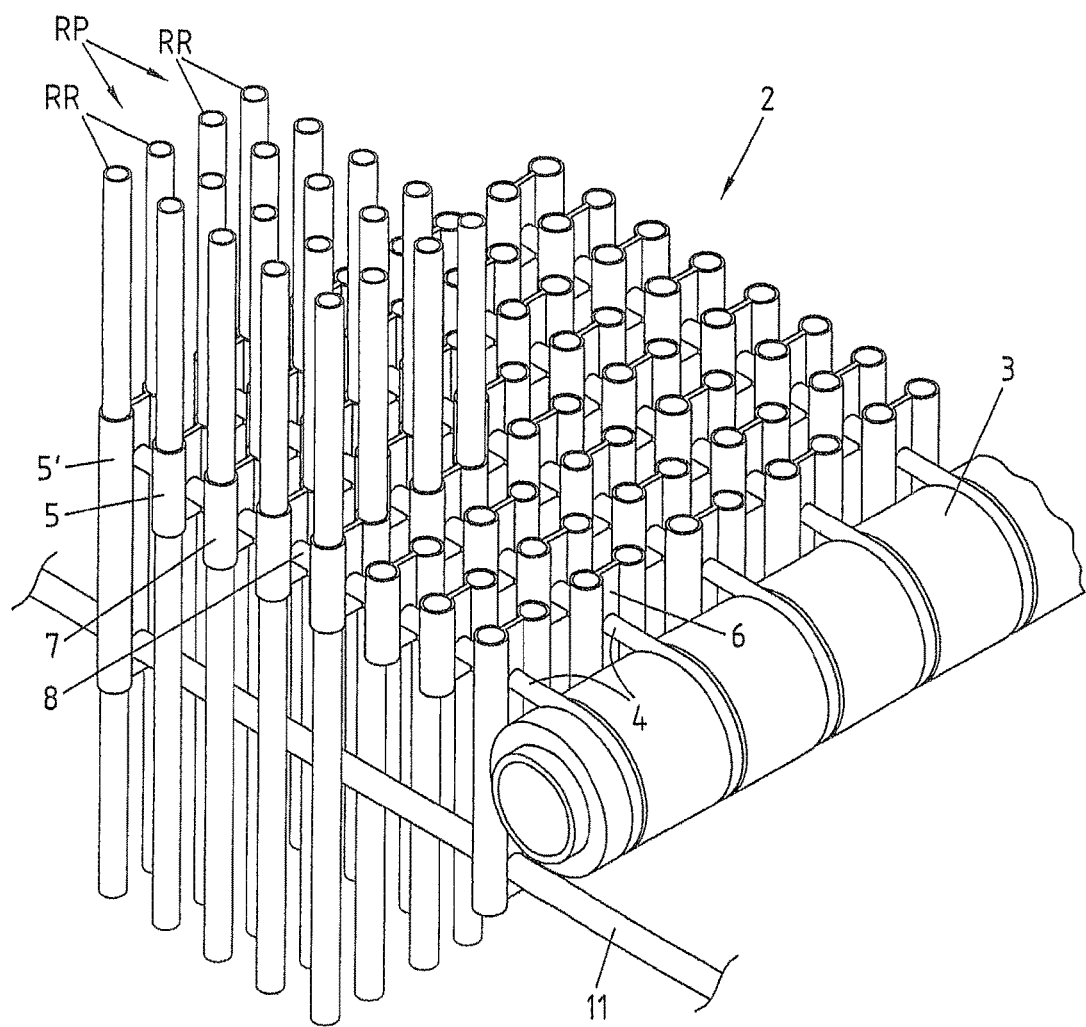
FIG. 2 is a sectioned view of a spacer plane of the pipe bundle from FIG. 1 along the plane II-II from FIG. 1.

The structure of a spacer plane 2 is illustrated in FIG. 2 in a sectioned view of the pipe bundle RB. The spacer plane 2 has a frame 3 which is arranged outside the pipe bundle RB and to which rod-like supports 4 are fitted. The rod-like supports 4 extend within the spacer plane 2 in the intermediate space between two adjacent pipe rows RR. A plurality of retention elements 5, 5' are successively fitted to the supports 4.

The retention elements 5, 5' have a spacing element 6, 6' through which the support 4 extends and which spaces apart two guide elements 7, 7' with respect to each other. The guide elements 7, 7' are constructed in a sleeve-like manner and arranged at opposing sides of the support 4. A pipe 1 of the pipe bundle RB is received in each guide element 7, 7'. In the exemplary embodiment illustrated and preferred in this respect, the guide elements 7, 7' are constructed in the form of pipe pieces.

Between the retention elements 5, 5' which are assembled on a support 4, there are provided tubular spacers 8 which are fitted to the support 4. These spacers 8 prevent a minimum spacing between the retention elements 5, 5' and consequently the pipes 1 of a pipe row RR from being fallen below by the spacers 8 moving into abutment at both ends thereof with the adjacent retention elements 5, 5'.

Owing to an appropriate alternating arrangement between retention elements 5, 5' and spacers 8 over the entire length of the respective supports 4, it is further ensured that the spacing between the pipes 1 of a pipe row RR also cannot become excessively large. Consequently, all the pipes 1 of the pipe bundle RB are positioned in the spacer plane 2 with predetermined spacing relative to each other. Whilst the mutual spacing of adjacent pipe rows RR is determined by the width of the spacing element 6, 6', the spacing between the pipes 1 of a pipe row RR is determined by the length of the spacers 8 and the spacing between two pairs RP of pipe rows is determined by the spacing of the supports 4.

In the exemplary embodiment illustrated and preferred in this respect, the inner diameter of the guide elements 7, 7' is slightly larger than the outer diameter of the pipes 1 of the pipe bundle RB. In this manner, a length change of the pipes 1 owing to the thermal expansion thereof is readily possible, without the frame 3 of the spacer plane 2 having to be assembled in a height-adjustable manner in the heat exchanger W.

In the spacer plane 2 illustrated in FIG. 2, two different types of retention elements 5, 5' are provided. As illustrated in particular in FIGS. 3 and 4, there is provided in both retention elements 5, 5' of the spacer plane 2 an opening 9 for the passage of the support 4 in the spacing element 6, 6' arranged between the guide elements 7, 7'. The spacing element 6, 6' is constructed in the embodiment illustrated and preferred in this respect as a web in the region of the smallest spacing between the guide elements 7, 7'. The guide elements 7, 7' are constructed in a sleeve-like manner with a circular cross-section. The opening 9 for the passage of the support 4 is provided in the same manner as the support 4 itself with a circular cross-section. Therefore, the retention element 5, 5' can readily rotate slightly about the support 4.

The width of the retention element 5, 5' is produced from the diameter of the guide elements 7, 7' and the width of the web-like spacing element 6, 6'. In the exemplary embodiment illustrated and preferred in this respect, the height of the retention element 5, 5' is many times greater than the diameter of the guide elements 7, 7' and the opening 9 for the passage of the support 4 is arranged offset in an eccentric manner with respect to an edge of the spacing element 6, 6'.

Figure 4:
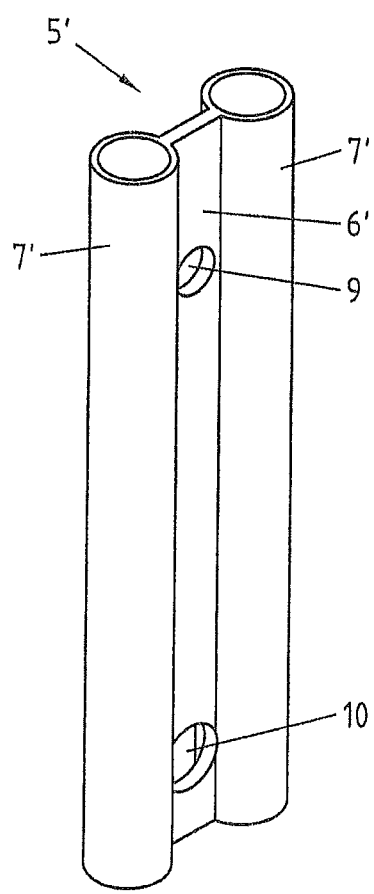
FIG. 4 shows another retention element of the spacer plane from FIG. 2, FIGS. 5a, 5b show a third exemplary embodiment of the retention element according to the invention.

As illustrated in particular in FIG. 4, individual retention elements 5' of the spacer plane 2 are constructed so as to be longer than the majority of the remaining retention elements 5. Furthermore, these retention elements 5' also have, in addition to an opening 9 for the passage of the support 4, an opening 10 for the passage of a spray hose 11. The opening 10 for the passage of the spray hose 11 is provided in the exemplary embodiment illustrated and preferred in this respect in the lower region of the spacer plane 2. However, it would be conceivable in principle to arrange the passage 10 for the spray hose 11 in the upper region of the spacer plane 2 in order to also clean away particles on the spacer plane 2.

Figure 5A:
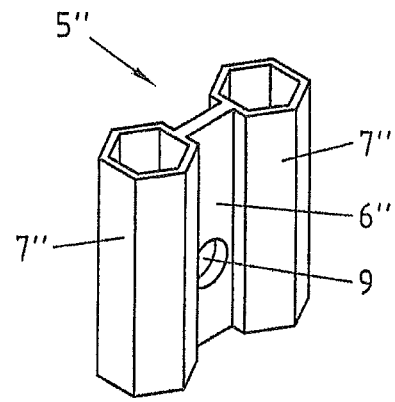

In an alternative configuration of the retention element 5" according to the invention which is illustrated in FIG. 5a, the guide elements 7" are constructed in a sleeve-like manner with an angular cross-section. In the exemplary embodiment illustrated and preferred in this respect, the cross-section is constructed in a hexagonal manner.

Figure 5B:
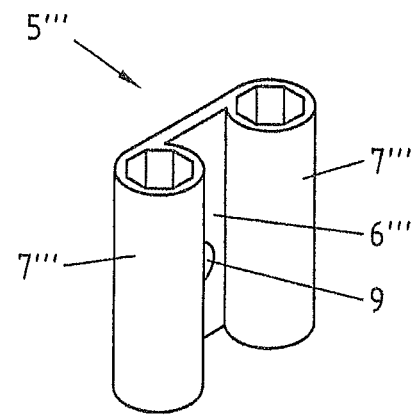

As illustrated in FIG. 5b, the spacing element 6''' may also be arranged in an eccentric manner between the two guide elements 7'''. The spacing element 6''' illustrated in FIG. 5b is also constructed in a web-like manner. Furthermore, the guide elements 7''' have an angular internal cross-section and a round external cross-section. In the exemplary embodiment illustrated and preferred in this respect, the internal cross-section of the guide elements 7''' is constructed in an octagonal manner.

Figure 3:
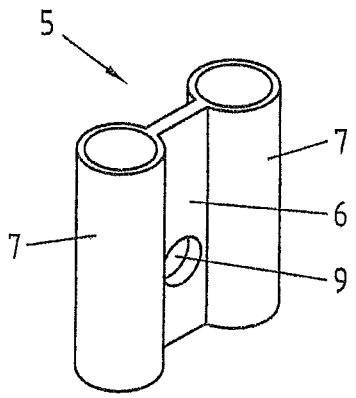
FIG. 3 shows a retention element of the spacer plane from FIG. 2.
Figure 6:
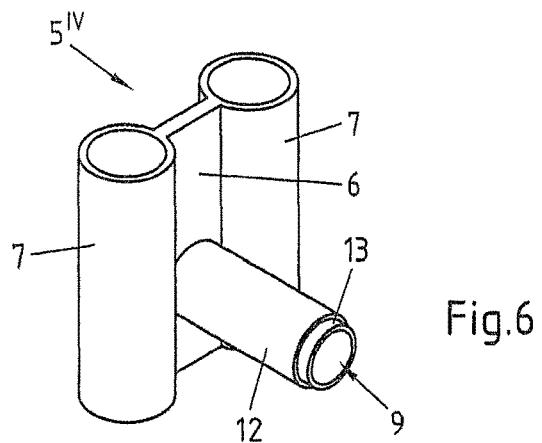
FIG. 6 shows a fourth exemplary embodiment of the retention element according to the invention.

The retention element $5^{IV}$ illustrated in FIG. 6 resembles in terms of the structure thereof in principle the retention element 5 illustrated in FIG. 3. In contrast to this retention element, however, the retention element $5^{IV}$ illustrated in FIG. 6 further comprises at least one spacer 12 which is constructed as a tubular sleeve concentrically with respect to the opening 9 for the passage of the support 4 of the spacer plane 2.

The retention element $5^{IV}$ is injection moulded in an integral manner together with the at least one spacer 12. The spacer 12 has a connection portion 13 at the outer end thereof. In the exemplary embodiment illustrated and preferred in this respect, the outer diameter in the connection portion 13 is tapered so that the connection portion 13 can be inserted into the spacing element 6 of an adjacent retention element $5^{IV}$ and retained at that location, for example, in a frictionally engaging and/or positive-locking manner.

Figure 7:
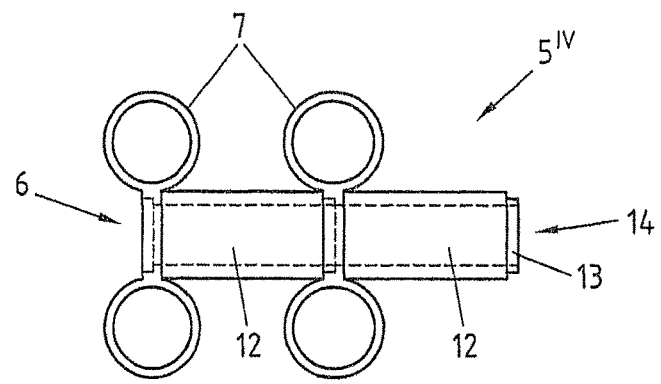
FIG. 7 shows a retention device which is composed of a plurality of retention elements according to FIG. 6.

In this manner, a retention device 14 can be produced from individual retention elements $5^{IV}$, as illustrated in FIG. 7. The individual retention elements $5^{IV}$ are arranged in alignment with each other, the spacer 12 of one retention element $5^{IV}$ being connected in each case to the spacing element 6 of the adjacent retention element $5^{IV}$.

Figure 8:
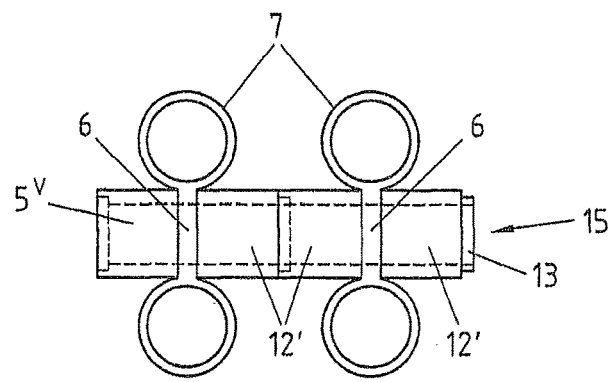
FIG. 8 shows an alternative retention device.

FIG. 8 illustrates an alternative configuration of the retention device 15. In this configuration, the retention elements $5^{V}$ have spacers 12' at both sides of the spacing element $6^{IV}$. A spacer 12' of a retention element $5^{V}$ is connected to a spacer 12' of an adjacent retention element $5^{V}$ in order to form a retention device 15.

Figure 9:
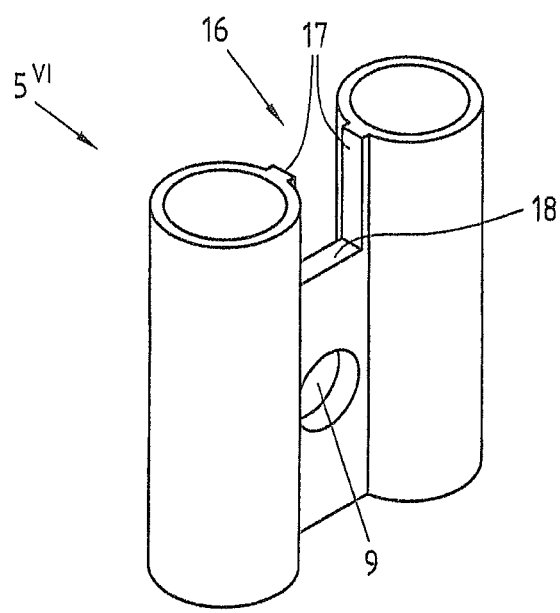
FIG. 9 shows a fifth exemplary embodiment of the retention element according to the invention.

FIG. 9 illustrates an exemplary embodiment of a retention element $5^{VI}$ having a recess 16 in the form of a receiving member, for instance, for introducing a sound-proofing plate of a pipe bundle (not illustrated). The recess 16 is constructed in a rectangular manner in the form of a groove which is introduced into the spacing element $6^{VI}$. In the illustrated and preferred retention element $5^{VI}$, the spacing element $6^{VI}$ forms both the groove sides 17 at both sides and the groove base 18. The opening 9 for the passage of a support is arranged eccentrically with respect to the retention element $5^{VI}$ owing to the recess 16. The retention element $5^{VI}$ illustrated has no spacer. Alternatively, however, at least one spacer of the previously described type could also be provided.

The invention claimed is:

1. A spacer plane of a pipe bundle of a heat exchanger, having a plurality of pipes forming a plurality of pipe rows and a plurality of rod-shaped supports,
   each rod-shaped support carrying a plurality of retention elements, and
   a pipe being retained in each retention element at mutually opposing sides of the rod-shaped support,
   wherein each retention element comprises a first end, a second end, two pre-formed tubular guide elements each having a continuous sidewall extending between the first end and the second end, each sidewall adapted to completely surround a pipe of the pipe bundle, and a spacing element arranged between the guide elements and having an opening for the passage of one of the plurality of rod-shaped supports, wherein the opening is arranged in the spacing element in an offset eccentric manner such that a central through-axis of the opening is closer to the second end of the retention element than the first end of the retention element.

2. The spacer plane according to claim 1, wherein two pipe rows are retained in each case by at least one of the plurality of rod-shaped supports.

3. The spacer plane according to claim 1, wherein the spacing elements each have an additional opening for the passage of a spray hose.

4. The spacer plane according to claim 1, comprising two adjacent retention elements that are spaced apart from each other by means of at least one spacer which is not connected to one of the retention elements.

5. The spacer plane according to claim 4, wherein the spacer is sleeve-shaped and is arranged around the opening for the passage of one of the plurality of rod-shaped supports.

6. The spacer plane according to claim 1, comprising a plurality of retention elements that are connected to each other in the longitudinal direction of at least one of the plurality of rod-shaped supports to form a retention device.

7. The spacer plane according to claim 6, wherein the connection is formed in a positive-locking manner, a non-positive-locking manner and/or a frictionally engaging manner.

8. The spacer plane according to claim 1, comprising two adjacent retention elements that are spaced apart from each other by means of at least one spacer, wherein the spacer and the spacing element are connected to each other.

9. The spacer plane according to claim 1, wherein each of the plurality of retention elements has a recess in the form of a receiving member.

10. The spacer plane according to claim 1, wherein an inner diameter of each of the tubular guide elements is larger than an outer diameter of the pipe.

11. The spacer plane according to claim 1, wherein longitudinal axes of the plurality of pipes extend in a vertical direction from a top of the heat exchanger to a bottom of the heat exchanger and longitudinal axes of the plurality of rod-shaped supports extend in a horizontal direction.

12. The spacer plane according to claim 1, wherein each retention element is pre-formed in an integral manner as a single piece by way of injection molding or extrusion.

13. The spacer plane according to claim 1, wherein a length of the sidewall of each tubular guide element as measured from the first end to the second end is larger than an outer diameter of the tubular guide element.

14. The spacer plane according to claim 1, wherein the retention elements and the pipes are made of plastic.

15. A retention element for a spacer plane of a pipe bundle, the retention element comprising:
    a first end;
    a second end;
    two pre-formed tubular guide elements each having a continuous sidewall extending between the first end and the second end, each sidewall adapted to completely surround a pipe of the pipe bundle; and
    a spacing element arranged between the guide elements and having an opening for the passage of a rod-shaped support,
    wherein the opening is arranged in the spacing element in an offset eccentric manner such that a central through-axis of the opening is closer to the second end of the retention element than the first end of the retention element.

16. The retention element according to claim 15, wherein a length of the sidewall of each tubular guide element as measured from the first end to the second end is larger than an outer diameter of the tubular guide element.

17. The retention element according to claim 15, wherein the retention element is made of plastic.

18. The retention element according to claim 15, wherein the retention element is pre-formed in an integral manner as a single piece by way of injection molding or extrusion.

19. The retention element according to claim 15, wherein the spacing element has an additional opening for the passage of a spray hose.

20. The retention element according to claim 15, further comprising a sleeve-shaped spacer arranged around the opening for the passage of the rod-shaped support.

21. The retention element according to claim 15, wherein the retention elements have has a recess in the form of a receiving member.

22. The retention element according to claim 15, wherein an inner diameter of each of the tubular guide elements is larger than an outer diameter of the pipe.

* * * * *

UNITED STATES PATENT AND TRADEMARK OFFICE
CERTIFICATE OF CORRECTION

PATENT NO. : 10,222,139 B2
APPLICATION NO. : 13/635047
DATED : March 5, 2019
INVENTOR(S) : Hans-Dieter Treptow et al.

It is certified that error appears in the above-identified patent and that said Letters Patent is hereby corrected as shown below:

In the Claims

Column 10, Line 28, Claim 21, after "retention" delete "elements have" and insert -- "element" --

Signed and Sealed this
Sixteenth Day of July, 2019

Andrei Iancu
*Director of the United States Patent and Trademark Office*